United States Patent [19]

Shimizu et al.

[11] Patent Number: 5,258,700
[45] Date of Patent: Nov. 2, 1993

[54] GENERATOR UNIT HAVING FUNCTION OF AUTOMATICALLY ADAPTING ITSELF TO PARALLEL OPERATION

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 824,178

[22] Filed: Jan. 21, 1992

[30] Foreign Application Priority Data

Jan. 24, 1991 [JP] Japan .................. 3-024133

[51] Int. Cl.⁵ ............................................ H02P 9/30
[52] U.S. Cl. ......................................... 322/25; 322/28
[58] Field of Search .................. 322/20, 22, 23, 24, 322/25, 28, 32

[56] References Cited

U.S. PATENT DOCUMENTS

| | | | |
|---|---|---|---|
| 3,758,843 | 9/1973 | Ishizaki et al. | 322/25 |
| 3,794,846 | 2/1974 | Schlicher et al. | 322/24 X |
| 4,129,818 | 12/1978 | Goto et al. | 322/10 |
| 4,463,306 | 7/1984 | de Mello et al. | 322/25 |
| 4,714,869 | 12/1987 | Onitsuka | 322/28 X |

FOREIGN PATENT DOCUMENTS 0020782 5/1981 Japan .
0145440 9/1987 Japan .

Primary Examiner—Kristine L. Peckman
Attorney, Agent, or Firm—Frishauf, Holtz, Goodman & Woodward

[57] ABSTRACT

A portable generator capable of automatically adapting itself to parallel operation of a plurality of generators including the present generator. A voltage detector and a current detector generate a voltage signal and a current signal respectively indicative of detected voltage and current of an AC output from the portable generator. A phase difference detector generates a signal indicative of a phase difference between the detected voltage and current. An oscillator has its output frequency controlled by the signal indicative of the phase difference. A target output waveform signal in the form of a sine wave signal is formed, which has a frequency corresponding to the output frequency of the oscillator. The target output waveform signal and the voltage signal are mixed at a variable ratio. At the start of the generator, the voltage signal takes precedence over the target output waveform signal to thereby cause an invertor circuit to effect switching control based on the voltage signal. After the start of the generator, a target output waveform to be realized through the switching control by the invertor circuit is gradually shifted from a waveform of the voltage signal to a waveform of the target output waveform signal.

7 Claims, 13 Drawing Sheets

FIG. 2(a)    a    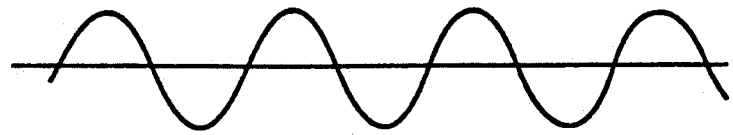
FIG. 2(b)    b    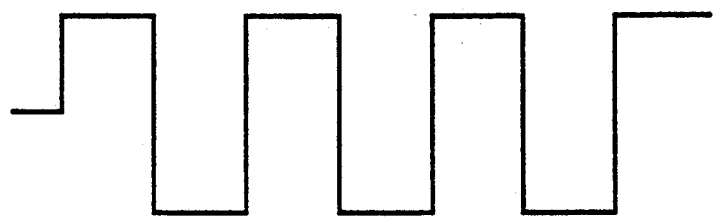
FIG. 2(c)    c    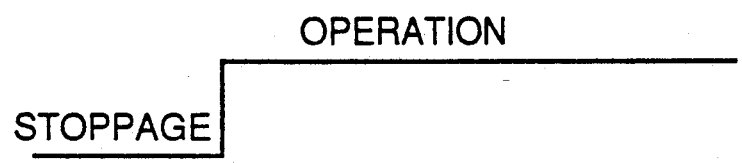
FIG. 2(d)    d    
FIG. 2(e)    $\overline{Q}$    
FIG. 2(f)    f    

FIG. 7(a) g 
FIG. 7(b) h 
FIG. 7(c) i 
FIG. 7(d) g' 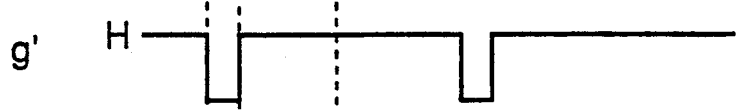
FIG. 7(e) h' 
FIG. 7(f) i' 
FIG. 7(g) j 
FIG. 7(h) k 
FIG. 7(i) l 
FIG. 7(j) m 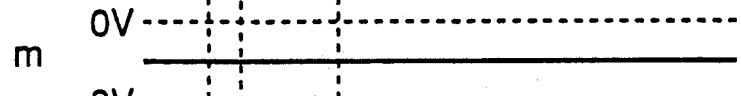
FIG. 7(k) m 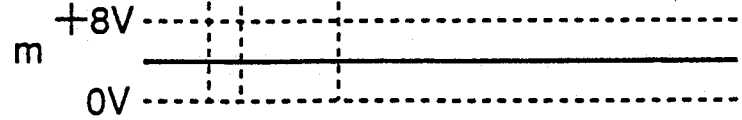

GENERATOR UNIT HAVING FUNCTION OF AUTOMATICALLY ADAPTING ITSELF TO PARALLEL OPERATION

BACKGROUND OF THE INVENTION

1. Field of the Invention

This invention relates to a portable generator, and more particularly to a portable generator having the function of automatically adapting itself to parallel operation of a plurality of portable generators including the first-mentioned portable generator connected in parallel with each other by automatically synchronizing the phases of outputs from the generators.

2. Prior Art

When a plurality of portable generators connected in parallel with each other are in operation, if the output voltages from the generators are not synchronous, there occurs a difference between the output voltages. This causes electric current to flow from one generator into another generator, which can result in such an excessive amount of electric current flowing in the one generator as may destroy component parts thereof. Therefore, it is required to synchronize the output voltages from the generators.

To this end, even in the case of parallel operation of identically-constructed portable generators, it is required to provide wiring for transmitting signals for informing each other of operating conditions thereof. Further, as disclosed e.g. in Japanese Patent Publication (Kokoku) No. 56-20782, it is required to employ an automatic synchronizing device and means for producing an operating point at which the phases coincide with each other in order to cause the automatic synchronizing device to operate promptly and reliably. Alternatively, as disclosed in Japanese Provisional Utility Model Publication (Kokai) No. 62-145440, a special adaptor has to be used for parallel operation of two portable generators, with one of them serving as a master generator while the other serves as a slave generator.

SUMMARY OF THE INVENTION

It is the object of the invention to provide a portable generator which dispenses with the use of special means such as an automatic synchronizing device and a special adaptor for carrying out parallel operation of a plurality of portable generators.

To attain the object, the present invention provides a generator including generator means having a primary output winding, an invertor circuit for effecting switching control of direct current obtained by rectifying alternating current generated by the primary output winding and smoothing the resulting rectified current, and an output circuit for supplying an output from the invertor circuit as alternating current output having a predetermined frequency.

The generator according to the invention is characterized by comprising:

output voltage-detecting means for detecting voltage of the alternating current output having the predetermined frequency and generating a voltage signal indicative of the detected voltage;

output current-detecting means for detecting current of the alternating current output having the predetermined frequency and generating a current signal indicative of the detected current;

phase difference-detecting means for detecting a phase difference between the detected voltage and the detected current and generating a signal indicative of the detected phase difference;

oscillating means having an output frequency thereof controlled by the signal indicative of the detected phase difference from the phase difference-detecting means;

sine wave-forming means for forming, as a target output waveform signal, a sine wave signal having a frequency corresponding to the output frequency of the oscillating means and generating the sine wave signal; and signal mixture ratio-determining means for determining a mixture ratio of the target output waveform signal and the voltage signal;

wherein the signal mixture ratio-determining means operates such that at the start of the portable generator, the voltage signal takes precedence over the target output waveform signal, to thereby cause the invertor circuit to effect the switching control based on the voltage signal, and after the start of the portable generator, a target output waveform to be realized through the switching control by the invertor circuit is gradually shifted from a waveform of the voltage signal to a waveform of the target output waveform signal.

Preferably, the oscillating means varies the output frequency thereof in response to the signal indicative of the detected phase difference from the phase difference-detecting means such that the phase difference is reduced.

More preferably, the generator includes frequency-dividing means for dividing the output frequency from the oscillating means to form a frequency-divided signal and supplying the frequency-divided signal to the sine wave-forming means, the target output waveform signal generated by the sine wave-forming means having an alternating current waveform similar to a sine wave which is obtained by the use of the frequency-divided signal.

Further preferably, the generator includes pulse width-modulating means for forming a pulse width modulated signal by the use of an output from the signal mixture ratio-determining means, the switching control by the invertor circuit being carried out based on the pulse width modulated signal to thereby obtain the alternating current output having an alternating current waveform substantially identical to a sine wave.

Preferably, the signal indicative of the detected phase difference from the phase difference-detecting means is in the form of phase difference voltage, the output frequency of the oscillating means being controlled by the phase difference voltage.

In the portable generator according to the present invention constructed as above, switching control by the invertor circuit is carried out based on a signal having a target output waveform to obtain AC output having a waveform corresponding to the target output waveform. As the target output waveform, at the start of the generator, a waveform taken from voltage of AC output already generated by another generator associated with the present generator is used, and after the start of the generator, a waveform of a target output waveform signal created within the present generator is used. In this connection, if the other generator has not been started, the waveform of the target output waveform signal created within the present generator is used even at the start of the present generator. The target output waveform signal is a sine wave signal having a variable frequency and formed based on the oscillation signal generated by the oscillating means. The frequency of the oscillation signal is controlled in response to phase difference voltage corresponding to the phase difference between the voltage and current of the AC output such that the phase difference is reduced to zero. This enables parallel operation of a plurality of portable generators.

When there is a phase difference in voltage between portable generators in parallel operation, there arises a flow of current between the generators. Accordingly, in one generator, voltage of AC output therefrom has an advanced phase relative to current of same, while in another generator, voltage of AC output therefrom has a retarded phase relative to current of same. Therefore, if the voltage and current of AC output are made coincident in phase with each other in the present generator, the phase of voltage of AC output from the present generator and that of voltage of AC output from another generator are necessarily made coincident with each other.

The above and other objects, features, and advantages of the invention will be more apparent from the ensuing detailed description taken in conjunction with the accompanying drawings.

BRIEF DESCRIPTION OF THE DRAWINGS

FIG. 2 is a timing chart useful in explaining the operation of the portable generator shown in FIG. 1;

FIG. 7 is a timing chart useful in explaining the operation of the phase difference detector of FIG. 6;

DETAILED DESCRIPTION

The invention will now be described in detail with reference to the drawings showing an embodiment thereof.

Figure 1:
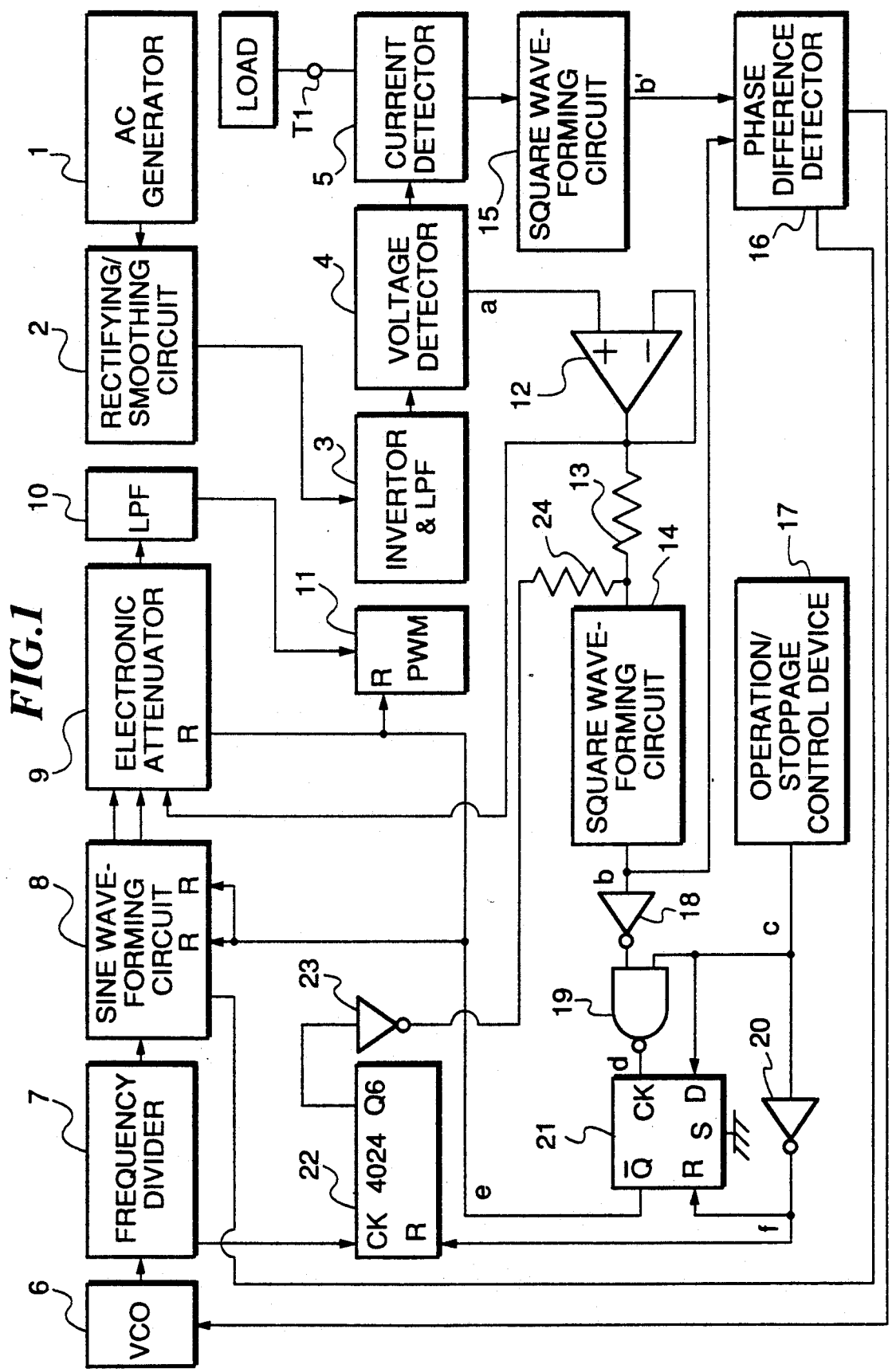
FIG. 1 is a circuit diagram schematically showing the whole arrangement of a portable generator according to an embodiment of the invention.

Referring first to FIG. 1, there is shown the whole arrangement of a portable generator according to the embodiment of the invention. In FIG. 1, reference numeral 1 designates an AC generator 1 which has its output connected to the input of a rectifying/smoothing circuit 2. The output of the rectifying/smoothing circuit 2 is connected to the input of an invertor and low-pass filter (hereinafter referred to as "LPF") 3. The output of the inventor and LPF 3 is connected via a voltage detector 4 and a current detector 5 to an output terminal T1.

On the other hand, a voltage-controlled type oscillator (hereinafter referred to as "VCO") 6 which outputs an oscillation signal to be converted into a target output waveform signal has an output thereof connected to the input of a frequency divider 7. The output of the frequency divider 7 is connected to the input of a sine wave-forming circuit 8 for generating the target output waveform signal, and the output of the sine wave-forming circuit 8 is connected to the input of an electronic attenuator (signal mixture ratio-determining means) 9, which has an output thereof connected via an LPF 10 to the input of a pulse width-modulator (hereinafter referred to as "PWM") 11.

Further, the output of the voltage detector 4 is connected to a non-inverting input terminal of an operational amplifier 12, the output of which is connected via a resistance 13 to the input of a square wave-forming circuit 14 and directly to the input of the electronic attenuator 9. The output of the square wave-forming circuit 14 is connected to the input of an invertor 18 and the input of a phase difference detector 16. The output of the current detector 5 is connected via a square wave-forming circuit 15 to the input of the phase difference detector 16. The output of the phase difference detector 16 is connected to the input of the VCO 6. The input of the phase difference detector 16 is also connected to the output of the sine wave-forming circuit 8.

Further, the input of a NAND circuit 19 is connected to the output of the invertor 18 as well as to the output of an operation/stoppage control device 17. The output of the operation/stoppage control device 17 is connected to a D input terminal of a D flip flop 21 as well as to the input of an invertor 20. The D flip flop 21 has a CK (clock) input terminal thereof connected to the output of the NAND circuit 19, an R (resetting) terminal thereof connected to the output of the invertor 20, and a Q-bar output (inverting output) terminal thereof connected to an R (resetting) terminal of the electronic volume 9 and an R (resetting) terminal of the PWM 11. Further, the output of the invertor 20 is connected to an R terminal of a counter 22. The counter 22 may be formed by, for example, a μPD4024 manufactured and sold by NEC Corporation, Tokyo, Japan. The counter 22 has a CK terminal thereof connected to the output of the frequency divider 7 and a Q6 output terminal thereof connected to the input of an invertor 23. The output of the invertor 23 is connected via a resistance 24 to the input of the square wave-forming circuit 14.

The parallel operation of the portable generators constructed as above is carried out by connecting the output terminal T1 of one generator to the output terminal T1 of another generator.

Next, the operation of the portable generator shown in FIG. 1 will be described.

AC current from the AC generator 1 is rectified and smoothed by the rectifying/smoothing circuit 2 into DC power. The DC power is converted into AC power by the invertor and LPF 3 under the control of the PWM 11, and the resulting AC power is supplied via the voltage detector 4, the current detector 5, and the output terminal T1, to a load connected to the output terminal T1. An output voltage signal a from the voltage detector 4, which is in the form of a sine wave as shown at (a) of FIG. 2, is supplied via the operational amplifier 12 to the square wave-forming circuit 14, where it is converted into a square wave signal b as shown at (b) of FIG. 2, which is supplied to the invertor 18 as well as to the phase difference detector 16. An output current signal from the current detector 5 is converted by the square wave-forming circuit 15 into a signal b', which is similar in waveform to the square wave signal b, and the signal b' is also supplied to the phase difference detector 16. The phase difference detector 16 supplies a phase difference voltage in response to the phase difference between the signals b and b' to the VCO 6 to control the frequency of the oscillation signal outputted therefrom.

The frequency-controlled oscillation signal from the VCO 6 is divided by the frequency divider 7 into a clock signal which is supplied to the sine wave-forming circuit 8. The sine wave-forming circuit forms, by the use of the clock signal, a sine wave signal having a stepped waveform, which is supplied to the electronic attenuator 9. The electronic attenuator 9 controls stoppage and passage of the sine wave signal, as well as the degree of damping of same during passage, and the resulting sine wave signal thus controlled is supplied via the LPF 10 to the PWM 11, which in turn generates a pulse signal which is pulse width-modulated by the sine wave signal. The LPF 10 shapes the sine wave signal having a stepped waveform into a sine wave signal having a smooth sinusoidal waveform. The pulse signal from the PWM 11 controls the duration of activation of gates of an invertor circuit of the invertor and LPF 3 so that the invertor circuit converts the DC power into a pulse train having a pulse width variable with the sine wave signal from the LPF 10, and an LPF of the invertor and LPF 3 forms the output from the invertor circuit into AC power having a smooth sinusoidal waveform, which is outputted from the output terminal T1 via the voltage detector 4 and the current detector 5.

If the operation/stoppage control device 17 is set to operate, an output signal c from the control device 17 is changed from a low level (i.e. stoppage) to a high level, as shown at (c) in FIG. 2.

The D terminal of the D flip flop 21 is supplied with the output signal c, the CK input terminal with a NAND signal d (as shown at (d) in FIG. 2) depending on a signal obtained by inverting the square wave signal b and the output signal c, and the R terminal with a signal f (as shown at (f) in FIG. 2) obtained by inverting the output signal c. The Q-bar output terminal of the D flip flop 21 generates a signal Q-bar (as shown at (e) in FIG. 2) depending on the above signals c, d, and f. The relationship between the signal Q-bar and the signals c, d, and f is shown in a table given below. In this table, symbol "↑" designates rise of the pulse signal d, symbol "↓" fall of same, and "s" indicates a signal on the S terminal of the D flip flop 21, which is constantly at a low level. Further, symbol "*" means that the signal level may be either low (L) or high (H) (don't care).

TABLE

| d | c | f | s | $\bar{Q}_{n+1}$ |
|---|---|---|---|---|
| ↑ | H | L | L | L |
| ↓ | H | L | L | $Q_n$ |
| * | L | H | L | H |

Let it now be assumed that the present generator is connected in parallel with another generator. When the other generator supplies AC power voltage to the present generator, the stoppage/operation control device 17 is set to operate to thereby cause the signal c to go high. Accordingly, as shown in the second row of the table, the signal Q-bar goes low upon a first rise of the signal d (see (d) and (e) in FIG. 2) whereby the reset state of the sine wave-forming circuit 8 is cancelled to cause the target output waveform signal therefrom to be supplied to the electronic attenuator 9. Accordingly, the electronic attenuator generates a signal having a selected target output waveform to permit the generator to supply AC power to the load. The signal having a target output waveform is obtained by mixing a voltage signal from AC output i.e. output from the operational amplifier 12, with the target output waveform signal at a suitable ratio. However, when no AC power voltage is supplied from the other generator, the CK input terminal of the D flip flop 21 is not supplied with the pulse signal, and hence the Q-bar output terminal of same continues to be at an initially-set high level, whereby the sine wave-forming circuit 8 remains in a reset state in which it does not generate the target output waveform signal, preventing the present generator from supplying AC output to the load.

The counter 22 is provided for eliminating the above-mentioned inconvenience, i.e. it enables the portable generator to start by itself. More specifically, if the operation/stoppage control device 17 is set to operate to cause the signal c to go high and hence the signal f to go low, the reset state of the counter 22 is cancelled, and after counting a predetermined number of clock pulses supplied from the frequency divider 7 and equivalent to a predetermined time period, the output from the output terminal Q6 of the counter 22 changes from a low level via a high level to a low level, so that the output signal from the invertor 23 changes from a high level via a low level to a high level. Accordingly, as can be understood from the table, the output signal Q-bar from the D flip flop 21 goes low to cancel the reset state of the sine wave-forming circuit 8, enabling the present generator to generate AC power having a waveform based on the target output waveform signal from the sine wave-forming circuit 8.

When the other generator has already started, the present generator is required to start in accordance with the waveform of AC output from the other generator. Otherwise, as soon as the present generator has started, the generator can become excessively loaded to even cause interruption of power supply to the load in use or distortion of the waveform of the pulse signal from the PWM at the start thereof to destroy the FET's of the invertor circuit. In the present embodiment of the invention, irrespective of whether the signal having the target output waveform is obtained, at the start of the present generator, from the AC output voltage signal or from the target output waveform signal, the output phase of the present generator is made substantially coincident with the output phase of the other generator at the start of the present generator. This is effected by the use of resetting terminals of the sine wave-forming circuit 8 etc.

Next, the component parts 1 to 5, 10, and 11 of the generator shown in FIG. 1 will be described in detail with reference to FIGS. 3A-3C.

Figure 3A:
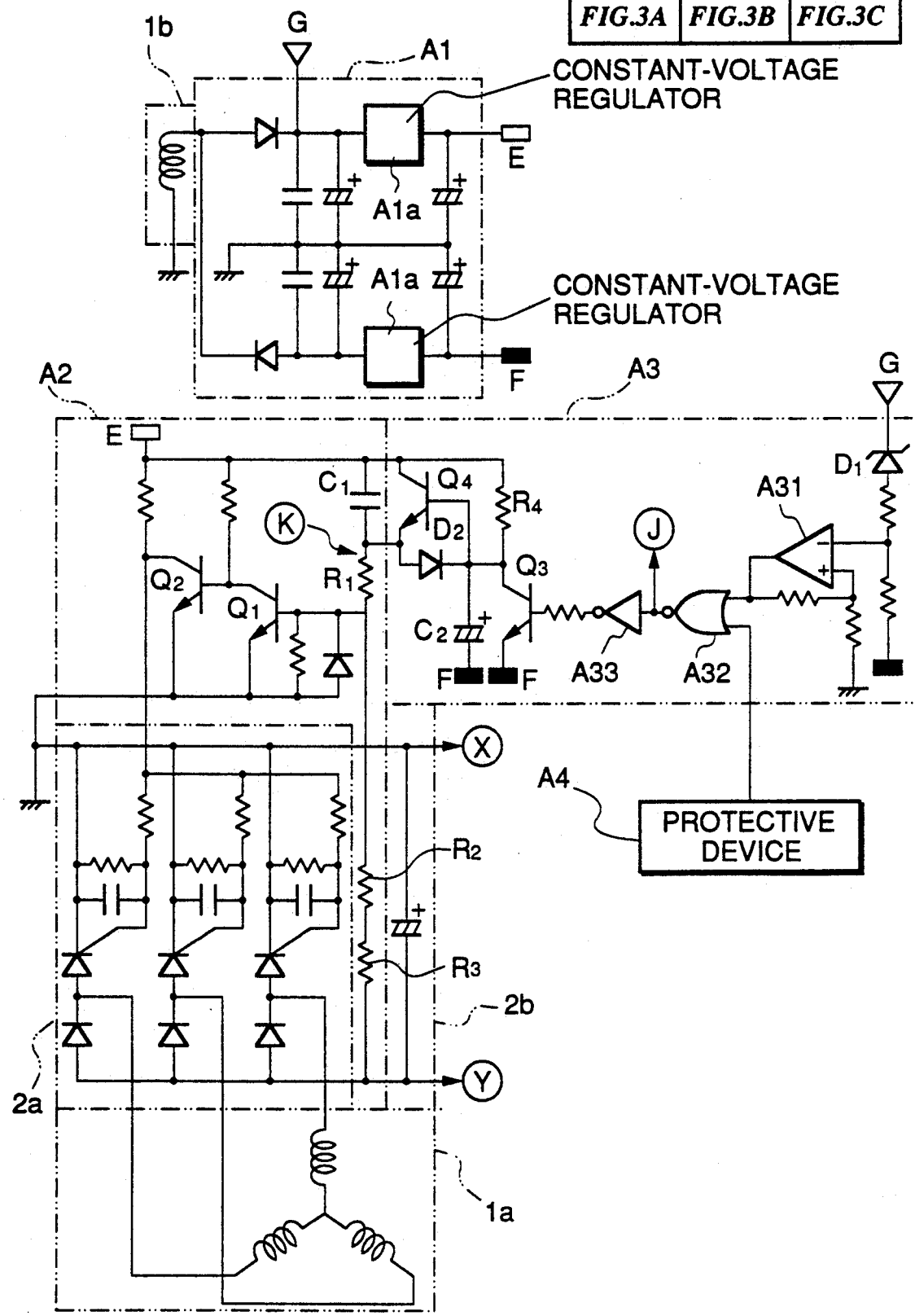
FIGS. 3A-3C are circuit diagrams showing details of part of the portable generator shown in FIG. 1.
Figure 3B:
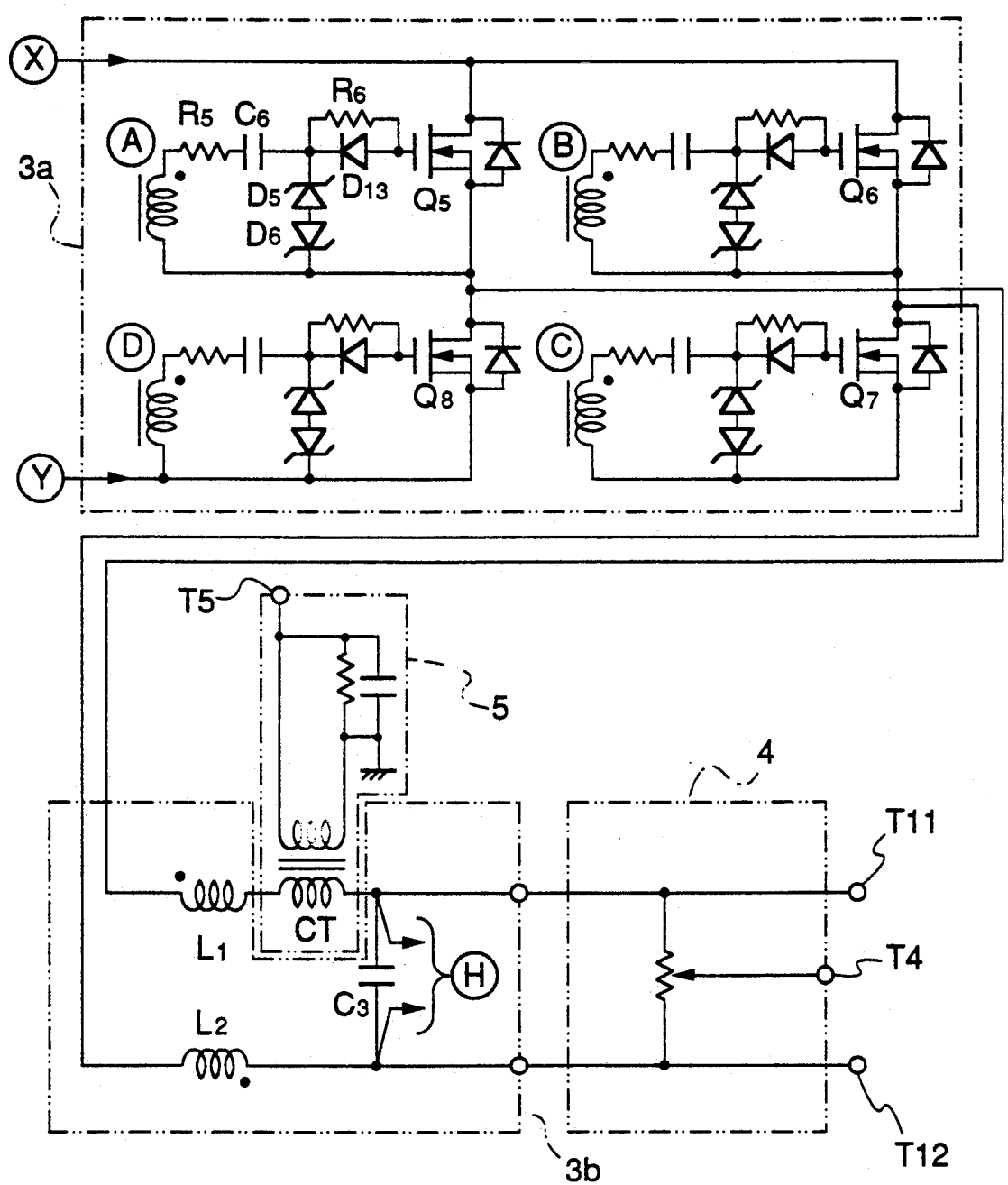
Figure 3C:
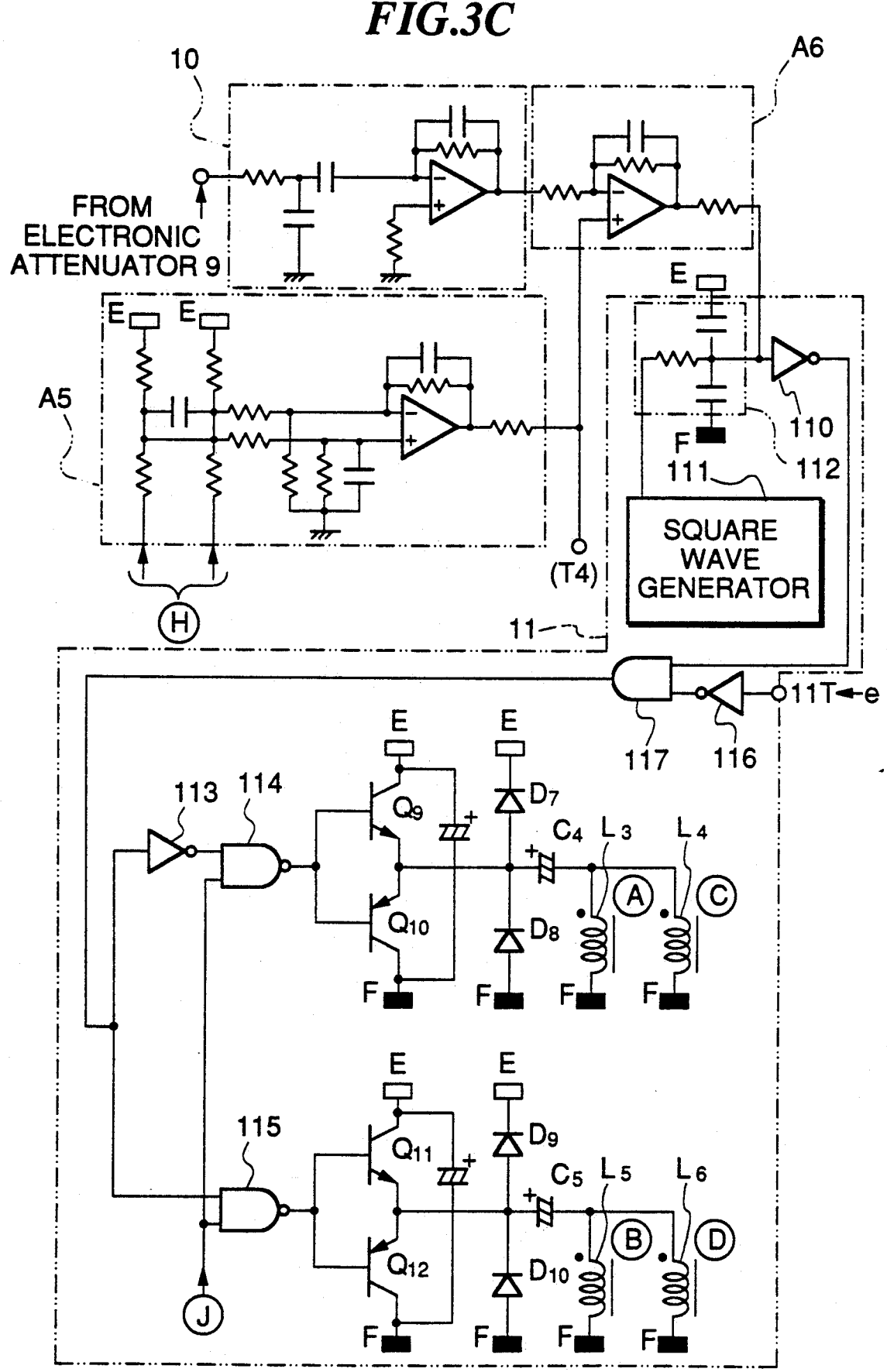

FIGS. 3A, 3B, and 3C show the circuit arrangement of the component parts 1 to 5, 10, and 11, and circuits associated therewith. In FIG. 3A, reference numerals 1a and 1b designate respectively a three-phase output winding and a single-phase auxiliary winding wound on a common stator core, not shown, of the AC generator 1, separately from each other. A magnet rotor, not shown, having a plurality of magnetic poles is arranged to be rotatively driven by an engine, not shown. The three-phase output winding 1a has its output connected to a bridge rectifier 2a comprised of three thyristors and three diodes, which in turn has its output connected to a smoothing circuit 2b. The bridge rectifier 2a and the smoothing circuit 2b cooperatively form the rectifying/smoothing circuit 2.

The single-phase auxiliary winding 1b has its output connected to a constant-voltage regulator circuit A1 having positive and negative output terminals E and F. The constant-voltage regulator circuit A1 has two sets of rectifiers, smoothing circuits, and constant-voltage regulators A1a, one set being operable in response to current flowing in one direction from the auxiliary winding 1b, the other set in response to current flowing in the other direction from the winding 1b so that the output terminals E, F supply positive constant voltage and negative constant voltage, respectively.

Reference numeral A2 designates a thyristor control circuit which has a power source-input terminal connected to the positive output terminal E of the constant-voltage regulator circuit A1, and another terminal grounded together with a positive terminal of the smoothing circuit 2b. The thyristor control circuit A2 has a signal-input terminal formed of a series circuit of a capacitor C1, and resistances R1 to R3. One end of the series circuit on the capacitor C1 side is connected to the positive output terminal E of the constant-voltage regulator circuit A1, while the other end of the series circuit on the resistance R3 side is connected to a negative terminal of the smoothing circuit 2b. A junction between the resistances R1 and R2 is connected to a base of a transistor Q1, which has a collector connected to a base of a transistor Q2. The transistor Q2 in turn has a collector connected to gate input circuits of the thyristors of the bridge rectifier 2a. The thyristor control circuit 6, which is arranged as above, controls input signals to the gate input circuits according to a potential at the junction between the resistances R1 and R2.

A junction K between the capacitor C1 and the resistance R1 is connected to the output of a transient inhibit circuit A3. The transient inhibit circuit A3 has a Zener diode D1, which has a cathode connected to an input terminal G of the constant-voltage regulator A1a provided on the positive output terminal E side of the constant-voltage regulator circuit A1, and an anode connected to the negative output terminal F of the constant-voltage regulator circuit A1 as well as to an inverting input terminal of an inverting comparator A31 formed of an operational amplifier, via resistances. The non-inverting comparator A31 has a non-inverting input terminal grounded via a resistance. The output of the inverting comparator A31 is connected to one input terminal of a NOR circuit A32, which has the other input terminal connected to a protective device A4 which detects a state of the generator necessitating protection, such as a state of overcurrent. The protective device A4 supplies a high level signal to the NOR circuit A32 when it detects a state of the generator necessitating protection. The output of the NOR circuit A32 is connected via an invertor A33 and a resistance to a base of a transistor Q3. The transistor Q3 has an emitter connected to the negative output terminal F of the constant-voltage regulator circuit A1, and a collector connected to the positive output terminal E of the constant-voltage regulator circuit A1 via a resistance R4 and to the negative output terminal F of the constant-voltage regulator circuit A1 via a capacitor C2. The capacitor C2 has a positive terminal connected to a base of a transistor Q4, which in turn has a collector connected to the positive output terminal E of the constant-voltage regulator circuit A1 and an emitter connected to an anode of a diode D2 and the junction K between the capacitor C1 and the resistance R1 of the thyristor control circuit A2. The diode D2 has a cathode connected to the positive terminal of the capacitor C2.

The smoothing circuit 2b has its output connected to an invertor circuit (switching means) 3a shown in FIG. 3B. The invertor circuit 3a is formed by a bridge circuit comprising four FET's (field effect transistors) Q5-Q8 as switching elements which have their gates connected to FET gate-driving signal circuits, described hereinbelow.

The output of the invertor circuit 3a is connected via a low-pass filter (LPF) 3b to output terminals T11 and T12, which are connected to a load, not shown. The LPF 3b is formed of coils L1 and L2 connected in series to the load, and a capacitor C3 connected in parallel with the load. The invertor circuit 3a and the LPF 3b forms the invertor and LPF 3.

The current detector 5 has a current transformer CT connected between the coil L1 and the capacitor C3 in series with the load. The voltage detector 4 and the current detector 5 have output terminals T4 and T5 connected to the input of the operational amplifier 12 and the input of the square wave-forming circuit 15, respectively. Output from the voltage detector 4, which is provided for detecting the phase of output voltage, may be substituted by output from a distortion detecting circuit A5, shown in FIG. 3C.

The capacitor C3 of the LPF 3b has opposite ends H connected to the distortion detecting circuit A5 formed of dividing resistances, a differential amplifier, etc. The distortion detecting circuit A5 directly compares between waveforms of voltages appearing on the output terminals T11 and T12 to thereby detect distortions in the waveform of the portable generator output voltage and an offset component thereof and generates a signal indicative of the results of the comparison.

In FIG. 3C, reference numerals 10 and 11 designate the LPF and the PWM, respectively. The output of the electronic attenuator 9 is connected to an inverting input terminal of an operational amplifier of the LPF 10. The LPF 10 shapes a sine wave having steps from the electronic attenuator 9 into a smooth sine wave. The output of the LPF 10 is connected to an inverting input terminal of an operational amplifier of a distortion correcting circuit A6. The operational amplifier has a non-inverting input terminal connected to the output of the distortion detecting circuit A5. The distortion detecting circuit A6 corrects the level of the sine wave inputted via the LPF 10 from the electronic attenuator 9 based on an output signal from the distortion detecting circuit A5, and generates a corrected sine wave signal.

In FIG. 3C, reference numeral 111 designates a square wave generator which generates a square wave having a frequency by far higher than the frequency of the sine wave outputted from the LPF 10. The output of the square wave generator 111 is connected to an integrating circuit 112, which integrates the square wave into a triangular wave signal.

The sine wave signal from the LPF 10, which has been corrected by the distortion correcting circuit A6, and the triangular wave signal from the integrating circuit 112 are superposed upon each other and the superposed signal is then supplied to an invertor buffer (pulse width modulating circuit) 110. The invertor buffer 110 is formed by an amplifier with a predetermined fixed threshold level which operates such that when a signal having a level exceeding the threshold level is inputted, it supplies an amplified low level signal, while when a signal having a level below the threshold value is inputted, it supplies an amplified high level signal, thus forming a pulse width modulated (PWM) signal. The invertor buffer 110 may be formed by an IC having a fixed threshold level relative to its gate input level, e.g. a threshold level of a CMOS gate on the input terminal side.

The output of the invertor buffer 110 is connected to one input terminal of an AND circuit 117 which has the other input terminal thereof supplied with the output (i.e. the signal Q-bar) from the Q-bar output terminal of the D flip flop 21 via an invertor 116. The invertor 116 and the AND circuit 117 cooperate to form a gate circuit for the PWM signal. When the signal Q-bar from the D flip flop 21 goes low, the gate opens. In other words, the PWM signal starts to be outputted from the gate circuit at a time point of fall of the signal Q-bar, i.e. at a time point the AC output voltage upwardly crosses a zero level. The output of the AND circuit 117 is connected via an invertor 113 to one input terminal of a NAND circuit 114 and on the other hand directly connected to one input terminal of a NAND circuit 115. The NAND circuits 114 and 115 have their other input terminals connected to the output terminal J of the NOR circuit A32 of the transient inhibit circuit A3.

The output of the NAND circuit 114 is connected to a first push-pull amplifier composed of transistors Q9 and Q10. The transistor Q9 of the first push-pull amplifier has its collector connected to the positive output terminal E of the constant-voltage regulator circuit A1, and the transistor Q10 has its collector connected to the negative output terminal F of the constant-voltage regulator circuit A1.

The output of the first push-pull amplifier, i.e. the junction between emitters of the transistors Q9, Q10 is connected to the junction between an anode of a diode D7 and a cathode of a diode D8. The diode D7 has its cathode connected to the positive output terminal E of the constant-voltage regulator circuit A1, while the diode D8 has its anode connected to the negative output terminal F of the regulator circuit A1. The diodes D7, D8 cooperate to damp surging occurring at pulse transformers, hereinafter referred to.

The junction between the anode of the diode D7 and the cathode of the diode D8 is connected to ends of primary coils L3 and L4 of pulse transformers A, C via a capacitor C4 for cutting off low frequency components. The other ends of the primary coils L3, L4 are connected to the negative output terminal F of the constant-voltage regulator circuit A1. Before passing the capacitor C4, the PWM signal has constant amplitude with respect to the reference level but the average voltage (integrated value) of this signal varies with the same period as the sine wave signal from the LPF 10. Therefore, this PWM signal contains a component of the same frequency as that of the sine wave signal. The capacity C4 is set to such a constant that the PWM signal, by passing the capacitor C4, is converted into a pulse train which varies as a whole in reverse phase to the component of the same frequency as that of the sine wave and always has a zero average voltage. This pulse train always having a zero average voltage is applied to the primary coils L3, L4 of the pulse transformers A, C.

The output of the NAND circuit 115 is connected to a second push-pull amplifier composed of transistors Q11 and Q12 like the first push-pull amplifier. The output of the second push-pull amplifier is connected to the junction between an anode of a diode D9 and a cathode of a diode D10. This junction is also connected to ends of primary coils L5 and L6 of pulse transformers B and D via a capacitor C5 which has the same constant as the capacitor C4.

Referring again to FIG. 3B, the driving signal circuit which is connected to gates of the FET's Q5–Q8 will be described. One end of the secondary coil of the pulse transformer A is connected to a gate of the FET Q5 via a series circuit formed by a damping resistance R5, and a capacitor C6 for reproducing the PWM signal before passing the capacitor C4, and a parallel circuit formed by a resistance R6 and a diode D13, while the other end of the secondary coil of the pulse transformer A is connected to a source of the FET Q5. The junction between the capacitor C6 and the parallel circuit formed by the resistance R6 and the diode D13 is connected to the above other end of the secondary coil of the pulse transformer A via a series circuit formed by Zener diodes D5 and D6. The diode D13 has its anode connected to the gate of the FET Q5, and the Zener diodes D5, D6 have their anodes connected with each other.

Provided between a secondary coil of each of the pulse transformers B, C and D and a gate of a corresponding one of the FET's Q6–Q8 is the same circuitry as the above described one provided between the secondary coil of the pulse transformer A and the gate of the FET Q5.

Figure 4:
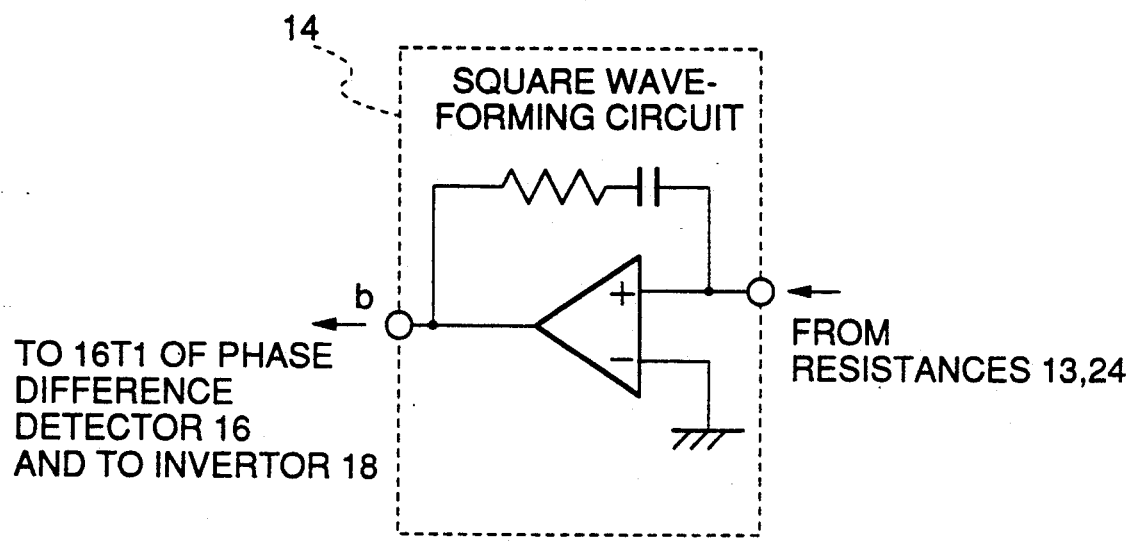
FIG. 4 is a circuit diagram showing an example of a square wave-forming circuit appearing in FIG. 1.

FIG. 4 shows, by way of example, details of the square wave-forming circuit 14 for converting the AC output voltage signal into the square wave signal b. This circuit is a positive feedback amplifier circuit using an operational amplifier. The signal having a sinusoidal waveform and corresponding in phase to the AC output voltage signal is supplied from the voltage detector 4 via the operational amplifier 12 to the square waveforming circuit 14, where it is amplified in a positive feedback manner into the square wave signal b having a steep rise/fall characteristic.

Figure 5:
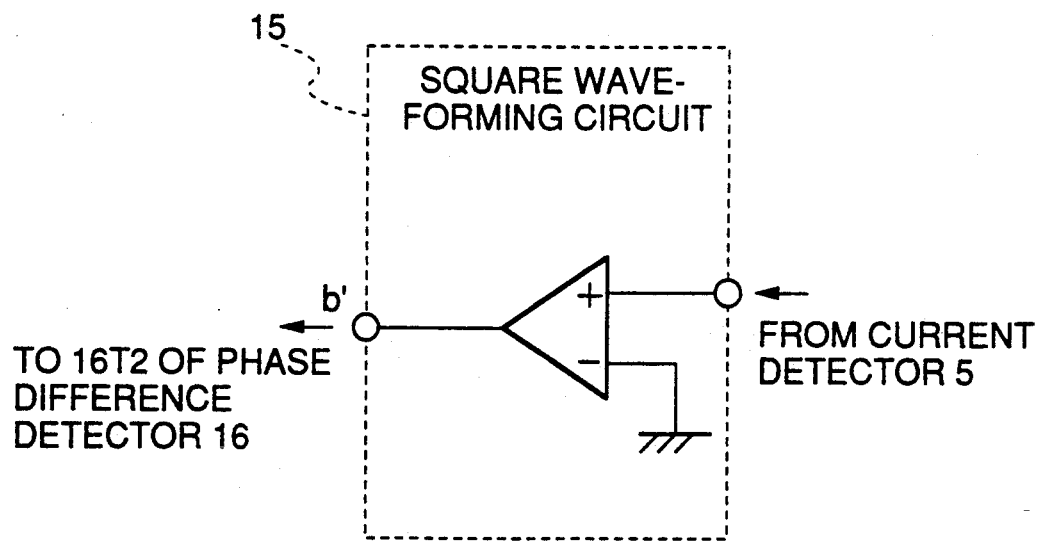
FIG. 5 is a circuit diagram showing an example of another square wave-forming circuit appearing in FIG. 1.

FIG. 5 shows, by way of an example, details of the square wave-forming circuit 15 for converting the AC output current signal into the square wave signal b'. This circuit is a high gain amplifier circuit using an operational amplifier. The square waveforming circuit 15 is supplied with the output current signal having a sinusoidal waveform and corresponding in phase to the phase of the load current from the current detector 5, and converts same into the square wave signal b' having a steep rise/fall characteristic.

Figure 6:
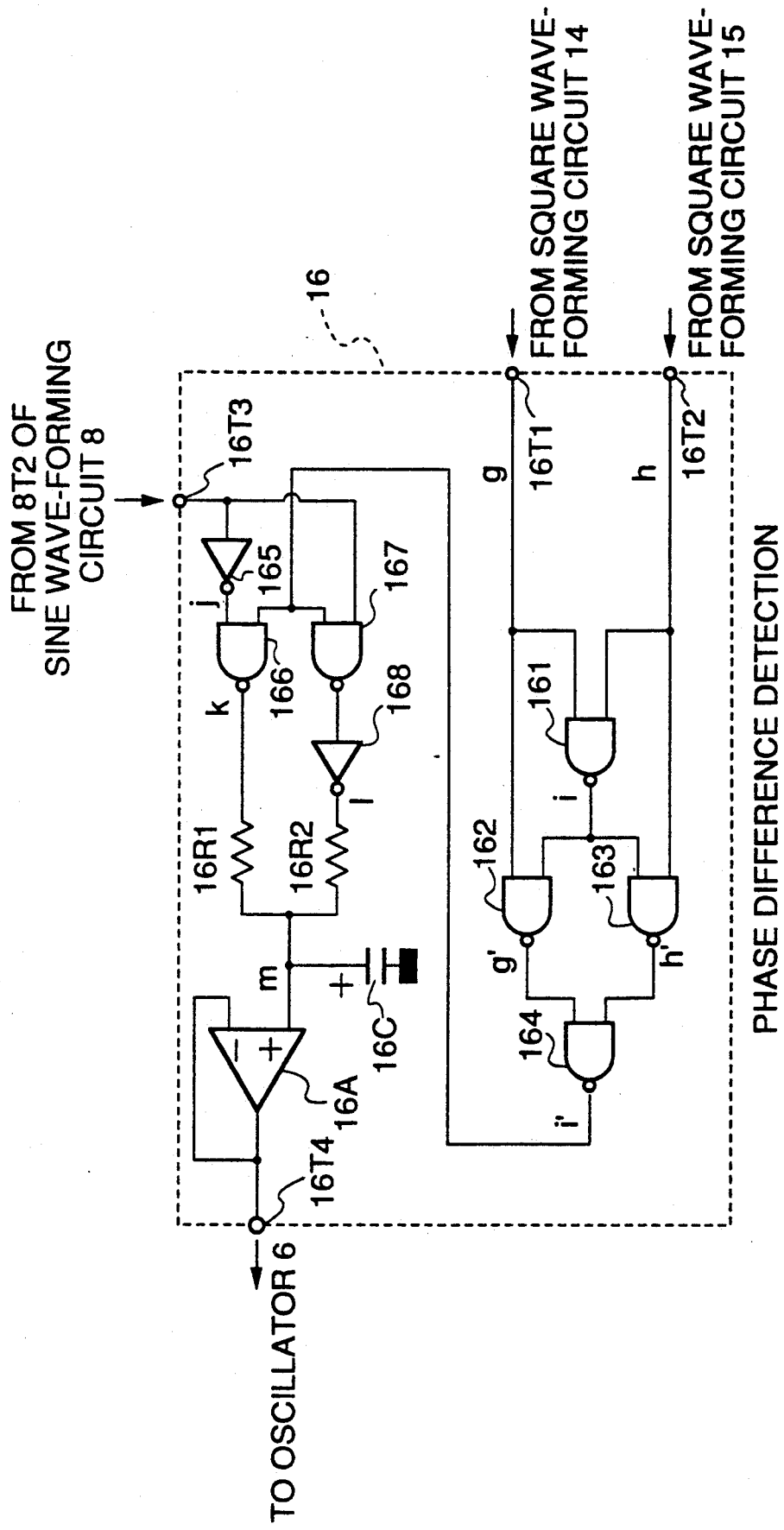
FIG. 6 is a circuit diagram showing an example of a phase difference detector appearing in FIG. 1.

FIG. 6 shows, by way of example, details of the phase difference detector 16. The operation of the phase difference detector 16 will be described with reference to FIG. 7. The square wave signal g (as shown at (a) in FIG. 7) from the square wave-forming circuit 14, which represents the phase of the AC output voltage, and the square wave signal h (as shown at (b) of FIG. 7) from the square wave-forming circuit 15, which represents the phase of the AC output current, are supplied via respective input terminals 16T1, 16T2 to a NAND circuit 161, which in turn supplies a NAND signal i (as shown at (c) in FIG. 7). The signals i and g are supplied to a NAND circuit 162, which in turn supplies a NAND signal g' (as shown at (d) in FIG. 7), whereas the signals i and h are supplied to a NAND circuit 163, which in turn supplies a NAND signal h' (as shown at (e) in FIG. 7). The signals g' and h' are supplied to a NAND circuit 164, which in turn supplies a NAND signal i' (as shown at (f) in FIG. 7). As can be understood from (a), (b), and (f) in FIG. 7, the NAND signal i' has a pulse width corresponding to the phase difference between the AC output voltage and current. The pulse signal i' rises at both a leading edge and a trailing edge of the square wave signal g having a relatively advanced phase.

Invertors 165, 168, NAND circuits 166, 167, a capacitor 16C, and resistances 16R1, 16R2 cooperate to form a phase difference-to-voltage convertor for generating voltage corresponding to the phase difference between the AC output voltage and current. A signal j (as shown at (g) in FIG. 7) is outputted from an invertor 165 which inverts a pulse signal supplied from the sine wave-forming circuit 8 via an input terminal 16T3. The signal j, which indicates the phase of the oscillation signal outputted from the VCO 6, has a frequency equivalent to a period half as large as the period of the target output waveform signal and is obtained by dividing each half cycle of the target output waveform signal into a first half and a second half to use them for determining whether the phase difference signal i indicates an AC output voltage having an advanced phase or one having a retarded phase relative to the AC output current. Further, the signal j determines a time period for opening the gate for the signal i. In FIG. 6, while the signal j assumes a high level, the signal i' is allowed to be outputted as a signal k from the NAND circuit 166. While the signal j assumes a low level, the signal i' is allowed to be outputted from the NAND circuit 167. However, while the signal j assumes a low level, the signal i' assumes a low level, so that the output from the NAND circuit 167 and hence an output signal l from the invertor 168 remains unchanged. More specifically, as shown at (h) and (i) in FIG. 7, whenever the signal i' goes low, the signal k goes high, whereas the signal l remains low. Here, the high level of a signal means 8 V, and the low level of same means −8 V. Therefore, when the signal k assumes a high level and the signal l assumes a low level, the two voltages of 8 V and −8 V cancell each other to form a signal m (as shown at (j) in FIG. 7) having 0 V. When the signal k goes low, both the signals k and l assume low levels, so that discharge of electricity from the capacitor 16c toward −8 V occurs, and then when the signal k goes high, charge of electricity toward 0 V occurs as shown in the figure. After all, the average voltage varies within a range of 0 V to −8 V. In this connection, the timing shown at (j) of FIG. 7 shows an example in which the output current has a retarded phase relative to the output voltage. However, when the output current has an advanced phase relative to the output voltage, the average voltage varies between 0 V and +8 V. Further, taking into account the fact that the signal j has a frequency equivalent to half the period of the output target waveform, the voltage varies within a range of −4 V to +4 V in response to the phase difference. The voltage corresponding to the phase difference is supplied via the output terminal 16T4 to the VCO 6.

Figure 8:
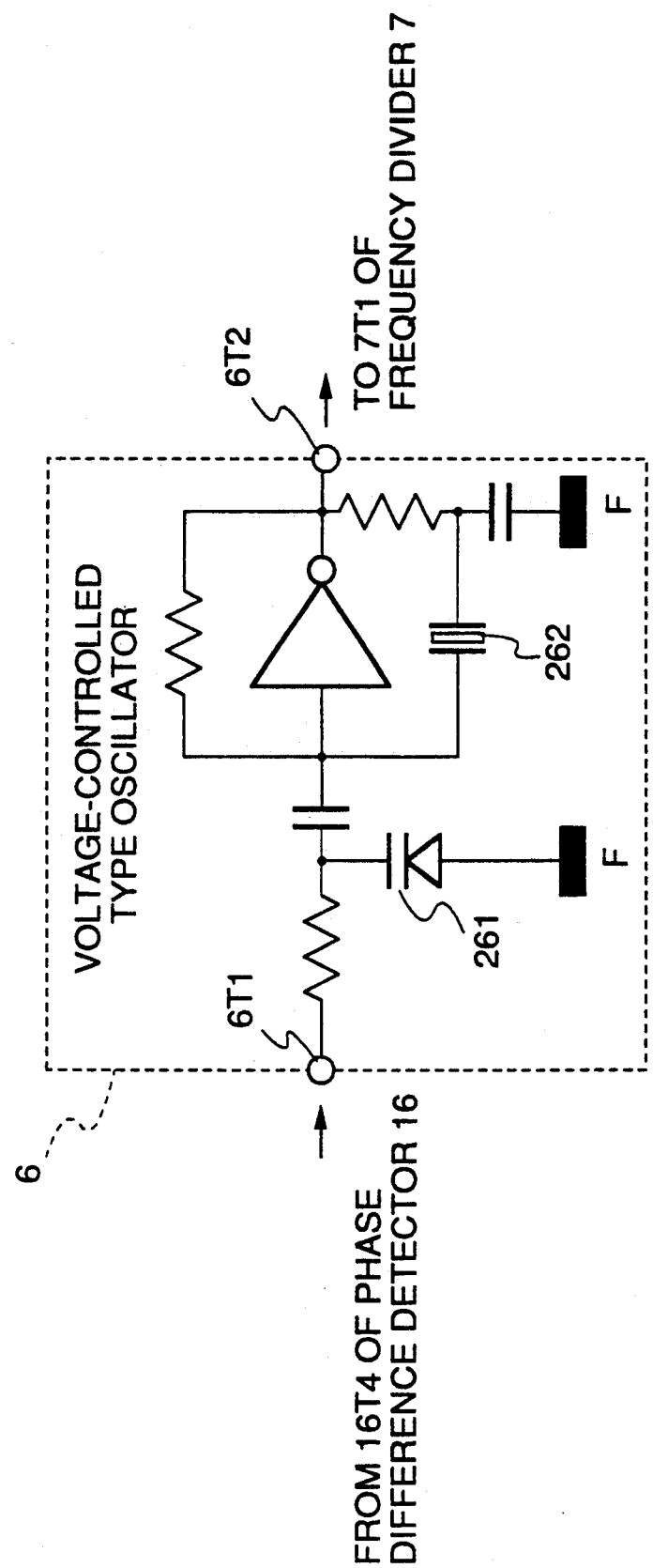
FIG. 8 is a circuit diagram showing an example of VCO appearing in FIG. 1.

FIG. 8 shows, by way of example, details of the VCO 6 for controlling the oscillation frequency by means of a varactor diode 261. More specifically, it utilizes the fact that if reverse bias voltage applied to the varactor diode is increased, its junction capacity decreases. For example, it can increase the frequency by increasing the reverse bias voltage, which enables to increase the frequency when the voltage of the AC output has an advanced phase relative to that of the current of same, and to decrease the frequency when the former has a retarded phase relative to that of the latter. The VCO 6 is supplied with voltage corresponding to the phase difference from the phase difference detector 16 via an input terminal 6T1, and supplies an oscillation signal having a frequency corresponding to the voltage via an output terminal 6T2. If a crystal resonator 262 is used in the VCO 6, the frequency is stable but can be varied by a combination capacity controlled by such a varactor diode 261 within a range of approx. ±0.01%.

Figure 9:
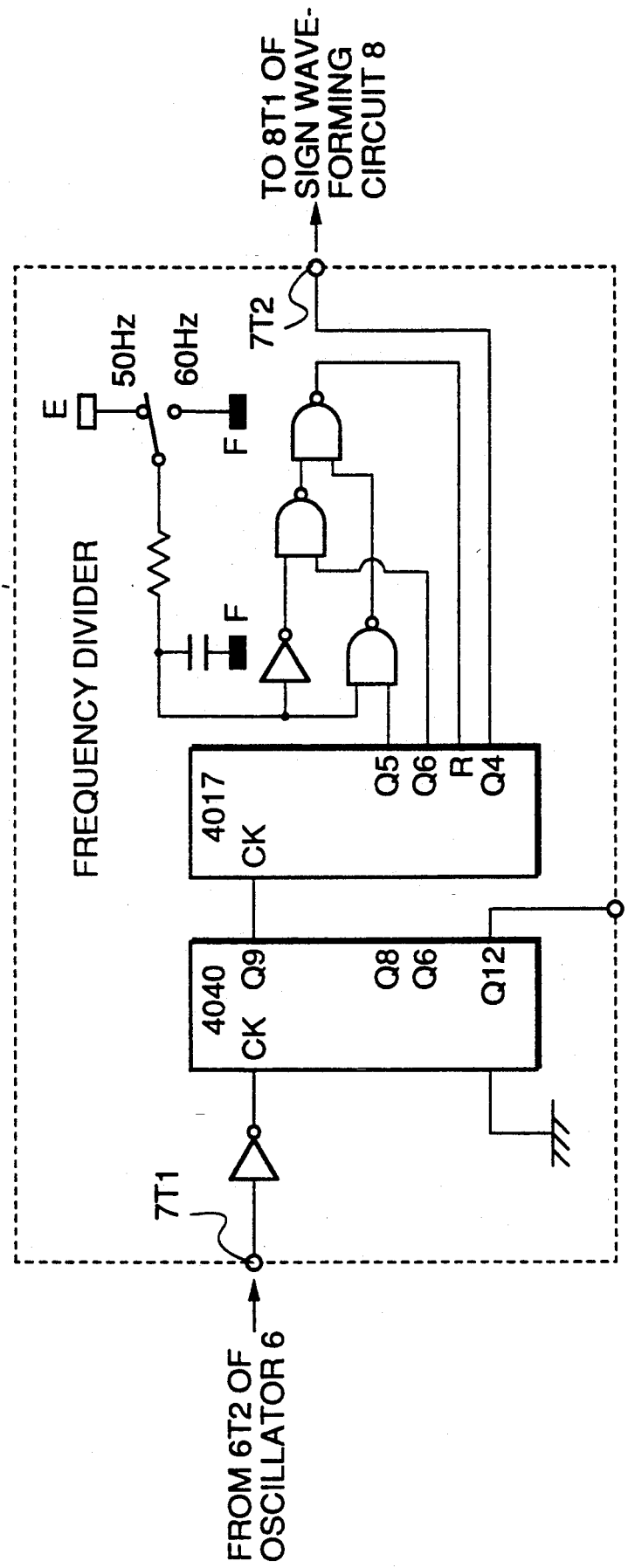
FIG. 9 is a circuit diagram of an example of a frequency divider appearing in FIG. 1.

FIG. 9 shows, by way of example, details of the frequency divider 7, which is formed e.g. by counters such as μP74HC 4040, μP74HC 4017 manufactured and sold by NEC Corporation, etc. The frequency divider 7 has an input terminal 7T1 supplied with the oscillation signal from the VCO 6, and an output terminal 7T2 which outputs a frequency-divided signal obtained by dividing the oscillation signal.

Figure 10:
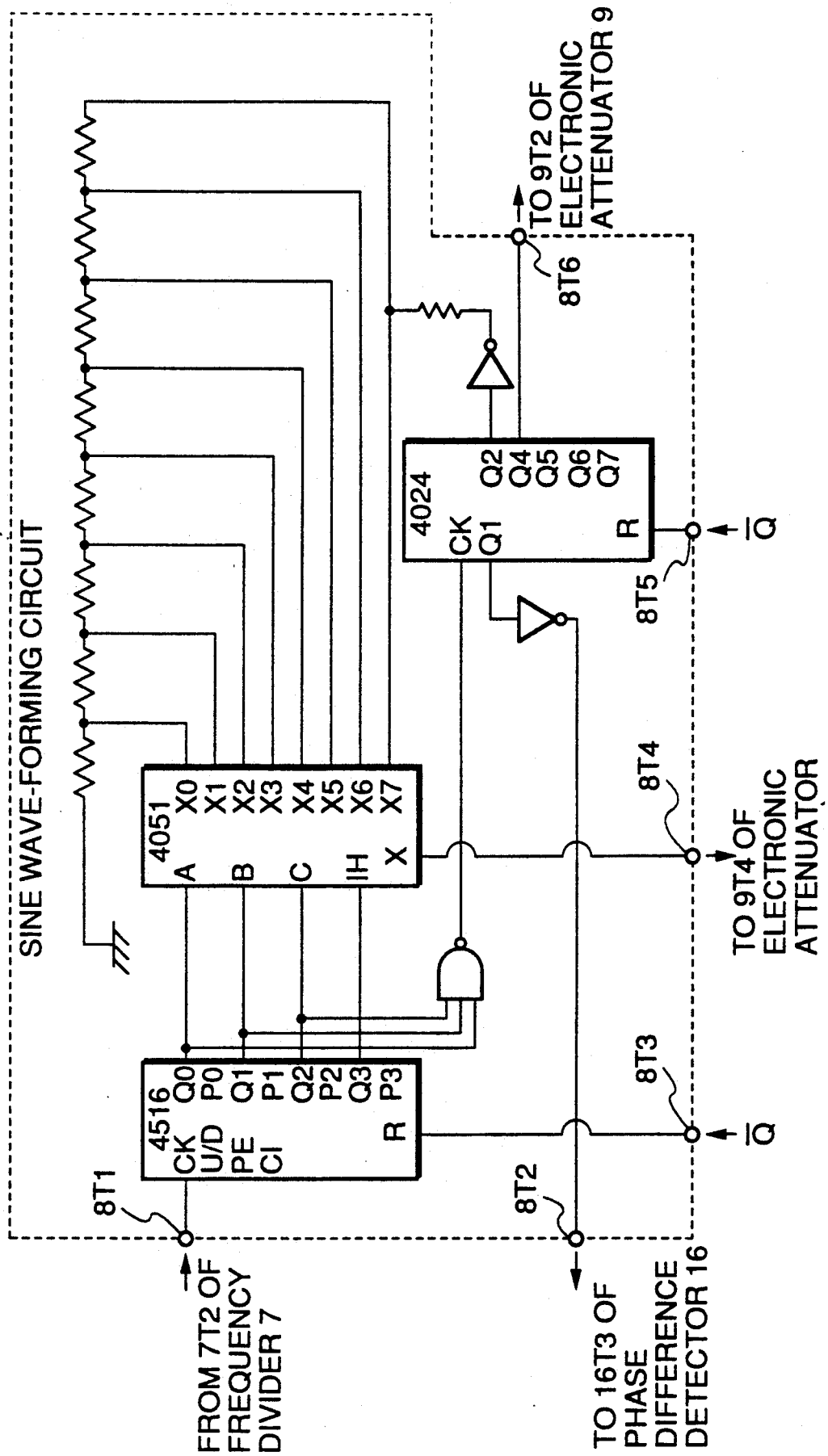
FIG. 10 is a circuit diagram showing an example of a sine wave-forming circuit appearing in FIG. 1.

FIG. 10 shows, by way of example, details of the sine wave-forming circuit 8, which is formed e.g. by a multiplexer 4051 such as μP74HC 4051 sold by NEC Corporation, etc. The multiplexer 4051 has an output terminal X which is connected to one of input terminals X0 to X7 depending on the states of terminals A, B, and C. The input terminals X0 to X7 are connected to respective corresponding junctions of voltage-dividing resistances. Each junction has an electric potential level according to its electrical position. Voltages from different junctions, which are inputted via the input terminals X0 to X7, are sequentially outputted from the output terminal X in response to the frequency-divided signal inputted from the frequency divider 7 to the sine wave-forming circuit 8, to thereby form a sine wave signal having stepped sinusoidal waveform, which is supplied via a terminal 8T4 to the electronic attenuator 9. Further, a clock signal is also supplied via a terminal 8T6 to the electronic attenuator 9. In FIG. 10, reference numeral 8T1 designates an input terminal for receiving the frequency-divided signal from the frequency divider 7, 8T2 an output terminal for supplying a pulse signal indicative of the phase of the oscillation signal to the phase difference detector 16, and 8T3 and 8T5 resetting terminals. The resetting terminals 8T3, 8T5 are supplied with the signal Q-bar, so that the sine wave signal starts to be outputted when the signal Q-bar falls, i.e. when the AC output voltage upwardly crosses a zero level, whereby the phase of the AC output voltage and the sine wave signal (target output waveform signal) are made coincident with each other.

Figure 11:
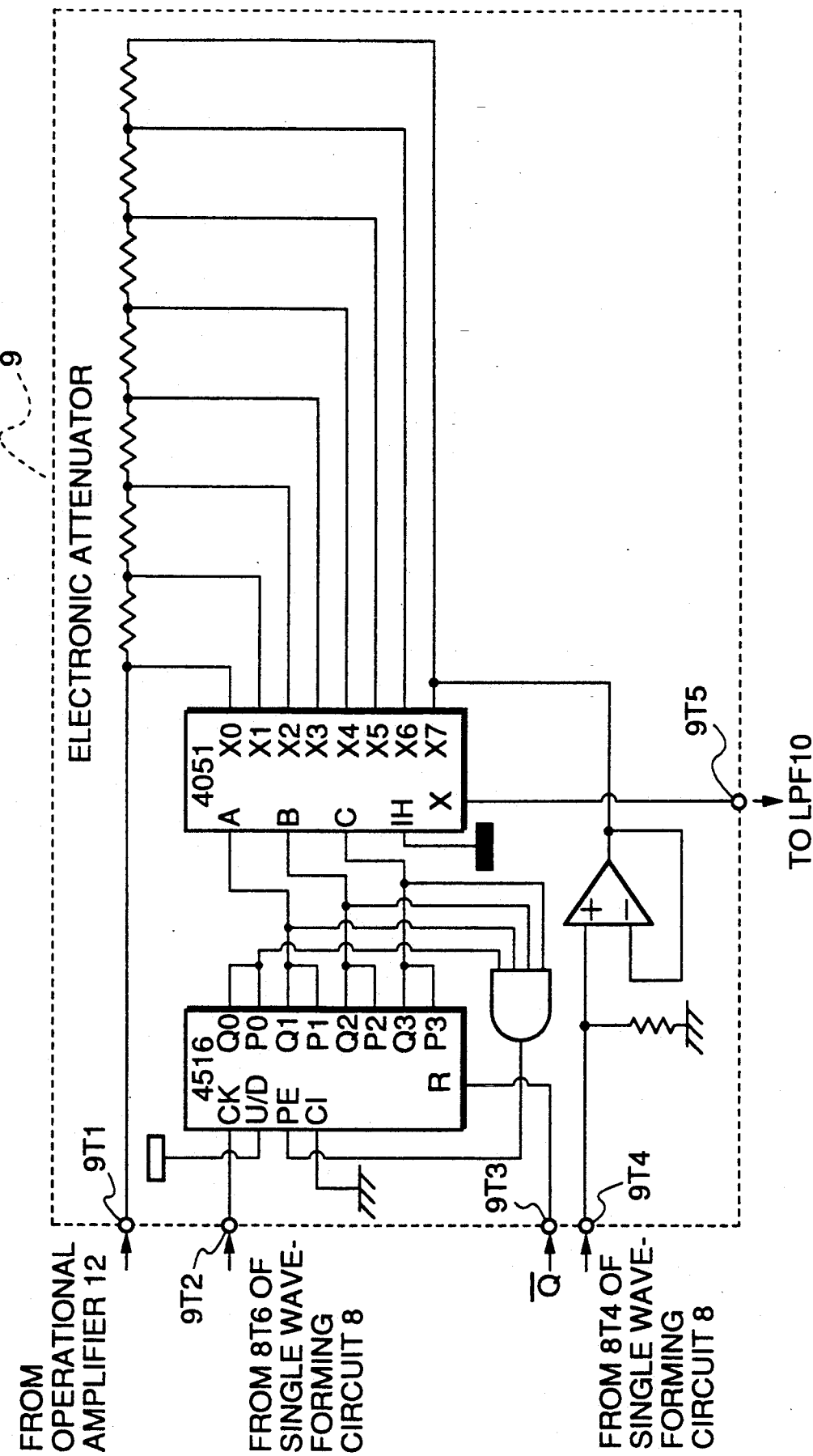
FIG. 11 is a circuit diagram showing an example of an electronic attenuator.

FIG. 11 shows, by way of example, details of the electronic attenuator 9 which is formed e.g. by the multiplexer 4051, referred to above, etc. The electronic attenuator 9 has input terminals 9T1 and 9T4 respectively supplied with the AC output voltage signal from the operational amplifier 12 and the target output waveform signal from the sine wave-forming circuit 8, as signals representing the output target waveform. Further, it has an input terminal 9T2 supplied with the clock signal from the sine wave-forming circuit 8, and an input terminal 9T3 supplied with the signal Q-bar from the D flip flop 21 as a reset-cancelling signal. The multiplexer 4051 in this figure operates in the same manner as the multiplexer 4051 of the sine wave-forming circuit 8 shown in FIG. 10, to sequentially connect input terminals X0 to X7 thereof to an output terminal X thereof. When the input terminal X0 is connected to the output terminal X, the AC output voltage signal from the operational amplifier 12 is outputted via the output terminal X and then via the terminal 9T5 to the LPF 10. When the input terminal X7 is connected to the output terminal X, the target output waveform signal from the sine wave-forming circuit 8 is supplied via the terminal X and then via the terminal 9T5 to the LPF 10. Each of the terminals X1 to X6 located between the terminals X0 and X7 outputs a signal which is a mixture of a component of the AC output voltage signal and a component of the target output waveform signal, the ratio of the former component to the latter component being determined according to their positions. For example, when the input terminal X1 is connected to the output terminal X, the output signal contains the AC output voltage signal component in a larger ratio than the target output waveform signal component. Thus, the output signal can be properly controlled, enabling to avoid an overload state at the start of the portable generator and to effect a smooth transition to parallel operation of generators. In particular, when the portable generator is started, the electronic attenuator 9 operates such that the AC output voltage signal inputted via the terminal 9T1 takes precedence over the target output waveform signal inputted via the terminal 9T4, to thereby cause the invertor circuit 3a (FIG. 3B) to perform a switching operation according to the AC output voltage signal. Further, after the start of the engine, the target waveform of the AC output to be realized through switching control of the invertor circuit 3a can be gradually changed from the waveform of the AC output voltage signal to that of the target output waveform signal. Since the electronic attenuator 9 is supplied with the signal Q-bar via the resetting terminal 9T3, the sine wave signal starts to be outputted when the signal Q-bar falls, i.e. at a time point the AC output voltage upwardly crosses a zero level. This time point is selected because at the time point the difference in phase between the output of the present generator and that of the other generator has the minimum adverse influence on the operation of the present generator.

As described hereinabove, the frequency of the oscillation signal from the VCO 6 can be automatically controlled by voltage corresponding to the phase difference between the voltage of the AC output and the current of same to thereby automatically make the phases of the voltage and current coincident with each other, which enables to automatically make the phases of outputs from a plurality of (i.e. any number of) generators in parallel operation coincident with each other.

In this connection, when the power factor has a value of 1, the phase of the AC output voltage and that of the AC output current coincide with each other, i.e. there is no phase difference therebetween. When the power factor is not equal to 1, i.e. when the load connected to the generator is an inductive load or a capacitive load, the voltage and the current are not coincident in phase. However, other generators in parallel operation with the present generator also generate output power having a similar phase difference between voltage and current thereof to that of the present generator, and hence no current flows between the generators. That is, stable parallel operation is performed in the state in which each generator has a phase difference between the output voltage and the output current. During operation at such a lower power factor than 1, the frequency of the AC output is deviated from a value assumed during operation at a power factor of 1. However, the degree of deviation is within 0.01%, which is smaller than the tolerances of fluctuations occurring in commercial power supply.

Figure 12:
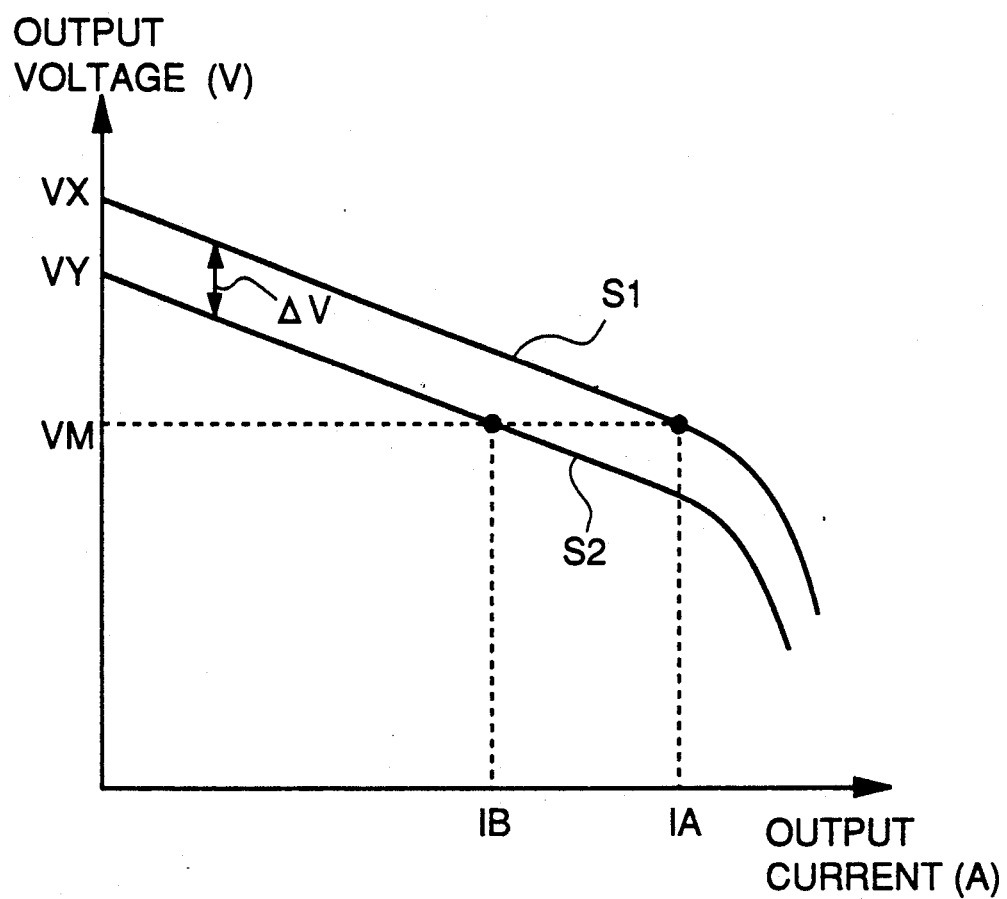
FIG. 12 is a graph useful in explaining how to determine the maximum output that is available during parallel operation of portable generators.

FIG. 12 shows a graph useful in explaining how to determine the maximum output that is available during parallel operation of two portable generators having output voltage-to-output current characteristics S1 and S2, respectively. Symbol IA designates the maximum allowable output current which corresponds to an output voltage value VM of a generator having the characteristics S1. The output current of the other generator having the characteristics S2 corresponding to the output voltage value VM is indicated by symbol IB. Accordingly, the maximum total output PM can be calculated as follows:

$$PM = VM \times (IA + IB)$$

In FIG. 12, $\Delta V$ shows a variation in set output voltage between the generators. The variation should fall within a predetermined range.

What is claimed is:

1. In a generator including generator means having a primary output winding, an invertor circuit means for switchingly controlling a direct current obtained by rectifying an alternating current generated by said primary output winding and by smoothing the resulting rectified current, and an output circuit means for supplying an output from said invertor circuit means as an alternating current output having a predetermined frequency, the improvement comprising:
output voltage-detecting means for detecting voltage of said alternating current output having said predetermined frequency, and for generating a voltage signal indicative of the detected voltage;
output current-detecting means for detecting a current of said alternating current output having said predetermined frequency, and for generating a current signal indicative of the detected current;
phase difference-detecting means for detecting a phase difference between the detected voltage and the detected current, and for generating a signal indicative of the detected phase difference;
oscillating means having an output frequency thereof controlled by said signal indicative of the detected phase difference from said phase difference detecting means;
sine wave-forming means for forming, as a target output waveform signal, a sine wave signal having a frequency corresponding to said output frequency of said oscillating means, and for generating the sine wave signal; and
signal mixture ratio-determining means for determining a mixture ratio of said target output waveform signal and said voltage signal;
wherein said signal mixture ratio-determining means operates such that at a start of operation of said generator, said voltage signal takes precedence over said target output waveform signal, to thereby cause said invertor circuit means to perform said switching control based on said voltage signal, and after the start of operation of said generator, a waveform of said alternating current output from said output circuit means to be realized through said switching control by said invertor circuit means, is gradually shifted from a waveform of said voltage signal to a waveform of said target output waveform signal.

2. A generator according to claim 1, wherein said oscillating means varies said output frequency thereof in response to said signal indicative of the detected phase difference from said phase difference detecting means, such that said phase difference is reduced.

3. A generator according to claim 2, further comprising frequency-dividing means for dividing said output frequency of said oscillating means to form a frequency-divided signal, and for supplying said frequency divided signal to said sine wave-forming means, said target output waveform signal generated by said sine wave-forming means having an alternating current waveform similar to a sine wave which is obtained by the use of said frequency-divided signal.

4. A generator according to claim 3, further comprising pulse width-modulating means for forming a pulse width modulated signal by the use of an output from said signal mixture ratio-determining means, said switching control by said invertor circuit means being performed based on said pulse width modulated signal to thereby obtain said alternating current output having an alternating current waveform substantially identical to a an alternating current waveform which is substantially sinusoidal.

5. A generator according to claim 2, wherein said signal indicative of the detected phase difference from said phase difference-detecting means is a voltage corresponding to the detected phase difference between the detected voltage and the detected current, said output frequency of said oscillating means being controlled by said voltage corresponding to the detected phase difference between the detected voltage and the detected current.

6. A generator according to claim 3, wherein said signal indicative of the detected phase difference from said phase difference-detecting means is a voltage corresponding to the detected phase difference between the detected voltage and the detected current, said output frequency of said oscillating means being controlled by said voltage corresponding to the detected phase difference between the detected voltage and the detected current.

7. A generator according to claim 4, wherein said signal indicative of the detected phase difference from said phase difference-detecting means is a voltage corresponding to the detected phase difference between the detected voltage and the detected current, said output frequency of said oscillating means being controlled by said voltage corresponding to the detected phase difference between the detected voltage and the detected current.

* * * * *